United States Patent [19]
Pollard

[11] 3,785,865
[45] Jan. 15, 1974

[54] LACTOSE REFINING PROCESS

[75] Inventor: Henry L. Pollard, Millbrae, Calif.

[73] Assignee: Foremost-McKesson, Inc., San Francisco, Calif.

[22] Filed: Aug. 3, 1972

[21] Appl. No.: 277,599

[52] U.S. Cl............................ 127/55, 99/57, 127/31, 127/53
[51] Int. Cl............................................. C13k 5/00
[58] Field of Search...................... 127/31, 53, 55; 99/57

[56] References Cited
UNITED STATES PATENTS

| | | | |
|---|---|---|---|
| 1,201,027 | 10/1916 | Dietrich | 127/31 |
| 2,145,109 | 1/1939 | Lisle | 127/31 |
| 2,188,908 | 2/1940 | Lavett | 99/57 |
| 2,467,453 | 4/1949 | Almy | 127/31 |
| 2,555,211 | 5/1951 | Wallace | 127/31 |
| 2,555,212 | 5/1951 | Wallace | 127/31 |
| 2,555,213 | 5/1951 | Wallace | 127/31 |
| 2,768,912 | 10/1956 | Peebles | 127/31 |
| 3,431,113 | 3/1969 | Braatz | 127/31 X |
| 3,583,968 | 6/1971 | Pien | 99/57 X |

Primary Examiner—Morris O. Wolk
Assistant Examiner—Sidney Marantz
Attorney—Paul D. Flehr et al.

[57] ABSTRACT

A process for refining crude lactose in which the lactose is dissolved in water in an amount sufficient to provide concentration of the order of 60 – 70% solids and at a temperature (e.g. 218°F.) near the boiling point (e.g. 220°F.) of the concentrated solution. The hot syrup is then filtered to remove solid impurities and the refined lactose removed by crystallization.

4 Claims, 1 Drawing Figure

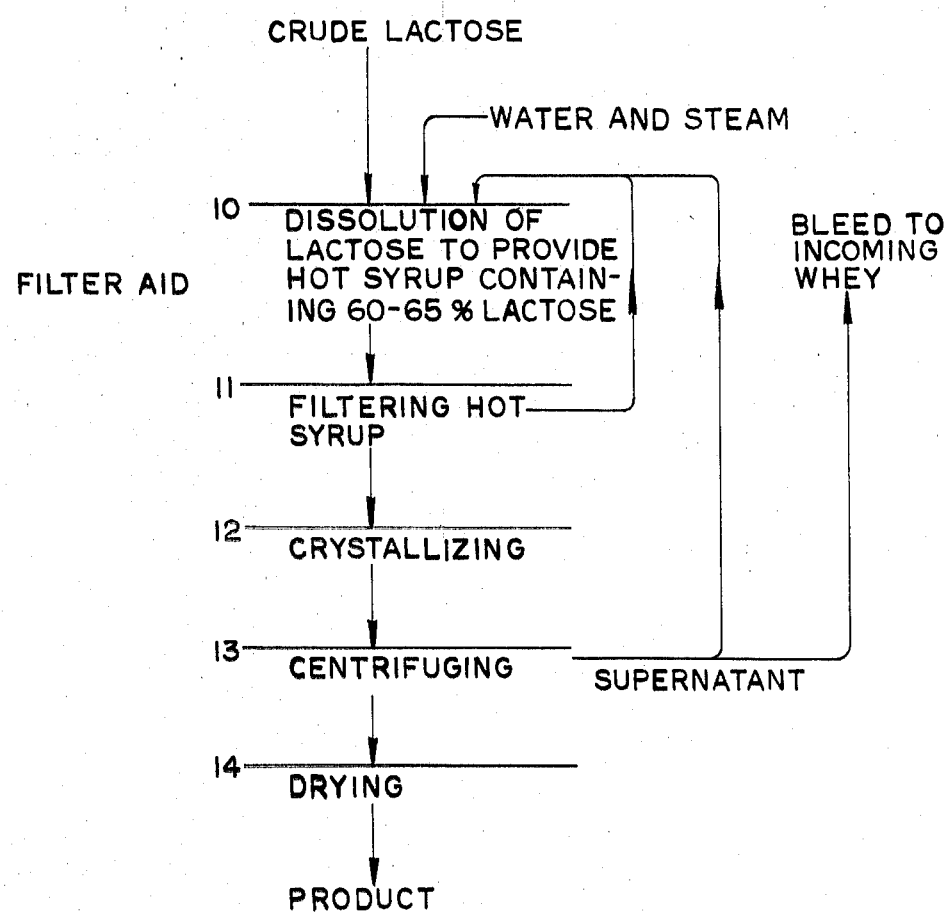

3,785,865

LACTOSE REFINING PROCESS

BACKGROUND OF THE INVENTION

This invention relates generally to processes for refining crude lactose. Commercial lactose having particulate matter, principally denatured protein, is commonly known as crude lactose. It is generally derived from cheese whey by processing involving concentration by evaporation and removal of lactose by crystallization. In one such process, liquid whey is concentrated by vacuum evaporation, after which the concentrate is cooled and the lactose content permitted to crystallize. The resulting slurry is diluted in cold water and subjected to hydraulic separation. Subsequently the lactose crystals can be further purified by centrifuging and washing. As a variation of such process, the material from the crystallizing operation can be treated on a rotating reel in the manner disclosed in U.S. Pat. No. 2,768,912, and the resulting mass of crystalline material subjected to centrifuging and washing. The crude lactose thus obtained, depending on the degree of washing and fineness of crystal size, will have about 3 percent or less of impurities, consisting mainly of residual whey protein.

When purer lactose products are desired, it has been common to subject the crude lactose to refining. In one such process the crude lactose is dissolved in water at about 200°F. to produce a concentration of about 30 – 35 percent solids. Phosphoric acid is then added to reduce the pH to a value of the order of pH 2–3, which serves to destroy spore formers at this temperature. After holding for a period of about 20 minutes, calcium hydroxide is added in an amount sufficient to react with the phosphoric ion to produce a precipitate which tends to absorb other solid impurities. A decolorizing agent like activated carbon is then added for clarification of the concentrate. The color thus removed is attributed primarily to the presence of riboflavin and other impurities. The resulting water-clear solution is then passed through a filter, such as one of the vacuum type, and thereafter through a polishing filter. The resulting syrup is then concentrated by vacuum evaporation to about 60 – 65 percent solids. The concentrate is then transferred to crystallizing tanks and cooled for the crystallization of lactose as described above. After the resulting crytalline lactose has been centrifuged and washed, it is dried to form a marketable product. Generally grinding is carried out in conjunction with drying to produce a final product of the desired particle size.

The refining process described above is relatively complicated and expensive compared to the present process. A substantial amount of added chemical is required, and a substantial number of processing steps are employed, including concentration by vacuum evaporation. In addition, such processes involve operating difficulties, including lactose seeding occuring during vacuum evaporation, which makes it difficult to obtain a uniform or large grain final product.

SUMMARY OF THE INVENTION

The present invention provides a relatively simple process for the refining of crude lactose.

In general, it is an object of the invention to provide a lactose refining process which makes unnecessary the use of added chemical, and which does not require concentrating the syrup as by vacuum evaporation before the lactose crystallizing operation.

Another object of the invention is to provide a lactose refining process which can be carried out more economically than prior processes, and which requires a minimum of processing steps and equipment.

In general, according to the present process, rude lactose is dissolved in water in such proportions and at an elevated temperature to produce a lactose concentrate containing about 60 – 70 percent solids at a temperature level near its boiling point. At this temperature level, protein contaminants are precipitated and the batch is heat sterilized with respect to spore formers. While the concentrate is maintained at this temperature level, it is subjected to filtration to remove solid impurities. Thereafter the concentrate is cooled to effect crystallization of lactose, and the lactose crystals removed from the mother liquor.

Additional objects and feature of the invention will appear from the following description in which the preferred embodiment has been set forth in detail in conjunction with the attached drawing.

BRIEF DESCRIPTION OF THE DRAWING

The single FIGURE of the drawing is a flow diagram showing one procedure for carrying out the process.

DESCRIPTION OF THE PREFERRED EMBODIMENT

The present process is applied to crude lactose produced by use of a process such as previously described. It may be in the form of dry granular material, or it may be a wet mass resulting from separation of crystalline lactose from mother liquor, followed by washing, in which event the free water content may be of the order of 3 to 8 percent. As previously stated, the solid impurities contained in such a product are of the order of 3 percent or less, consisting mainly of residual protein. As indicated in step 10, a quantity of such crude lactose is mixed with water in proportions such as to produce a concentrate containing from 60 to 70 percent solids, when the lactose is dissolved. The water may be near boiling point (212°F.) at the time the crude lactose is added, and it is heated as by steam injection and/or heating coils after the lactose is added and as the lactose dissolves. Heat is supplied in such a manner that the temperature of the syrup is maintained at a value near its boiling point. When all of the lactose is dissolved, the boiling point of the syrup is at a temperature level of 220° – 222°F. (for concentrations ranging from 60 to 65 percent solids), depending upon the lactose content, and the solution is near saturation. Preferably, heating is applied to maintain the temperature level about 2 – 4°F. below the boiling point of the solution. This serves to minimize excessive treatment temperature with resulting darkening, and avoids foaming which occurs when the material is boiled. During dissolution of the lactose refractometer readings may be taken to facilitate control of the concentration of the lactose at the desired level below the boiling point. Complete dissolution of the crude lactose under the above condition may require about 30 to 45 minutes.

Spore formers which are generally present in crude lactose are destroyed at temperatures of the order of 216°F. or higher. Therefore, in the present process destruction of spore formers takes place without the use of added chemical, such as phosphoric acid. To ensure destruction of spore formers, the syrup can be held at a temperature of the order of 216°–220° F. for a period of about 20 to 30 minutes.

Heat treatment as described above at a temperature level of the order of 216°–220°F. also serves to coagulate and precipitate protein material present, thus placing this material in such condition that it can be removed by subsequent filtration.

The equipment required for step 10 may be a simple tank provided with mechanical agitating means and means for direct introduction of steam and/or heating coils adapted to be supplied with steam.

Before subsequent filtration, a suitable filter aid is dispersed in the syrup. This may be one of the diatomaceous earth type in finely divided form, and the amount used may be of the order of 2 percent of the crude lactose. The filter aid may be added at the time the crude lactose is introduced into the water in step 10, or it may be added after all of the lactose has been dissolved.

In addition to adding a filter aid to the syrup, it may be desirable to add a material like activated carbon for decolorizing. Whether or not it is necessary to add a decolorizing agent depends upon the color characteristics of the crude lactose used as the source material, and the amount of color which can be tolerated in the final refined lactose.

Following step 10, the hot syrup is supplied to the filtering step 11, which can be carried out by use of a conventional pressure filter of the leaf type. Care is taken to prevent cooling of the syrup during filtration, thus avoiding any objectionable crystallization of lactose. By filtration, contaminant solids, largely precipitated protein, are removed on the filter membrane, thereby providing a purified lactose syrup. Steam followed by wash water may be passed through the filter following filtration of the syrup and the wash effluent returned to step 10 as indicated. The lactose syrup is then subjected to cooling and crystallization of lactose in the crystallizing step 12. Conventional crystallizing tanks or pans can be used for this purpose. Generally it is desirable to carry out this step in such a manner that in excess of 60 % of the lactose content is crystallized.

Following the crystallizing step 12, the batch of material is subjected to separating 13 as by centrifuging, thus removing the lactose crystals from the supernatant or mother liquor. All or a substantial part of the mother liquor can be returned to the step 10 as indicated. While in the centrifuge, the lactose crystals can be subjected to washing with fresh water, thereby effecting some further purification. The material from step 13 is then dried in step 14 to produce a final pure lactose product.

The process described above is capable of producing final products having a purity of the order of 99½ percent or higher, from crude lactose having a purity of 97 percent or higher. No chemical additives are required, and the syrup is not subjected to concentration by evaporation.

To maintain uniform purity of the final lactose, a part (e.g. 5 – 10 percent) of the supernatant from step 13 is bled off and merged with the whey being supplied to provide crude lactose.

An example of the process is as follows:

The source material was crude lactose in dry condition containing about 98½ percent lactose. 1200 lbs. of such crude lactose was introduced into a tank containing about 800 lbs. of water which had been heated to 212°F. While continually agitating the contents of the tank, the water was heated by a steam coil to gradually increase the temperature level during dissolution of the lactose. The temperature gradient was such as to maintain the temperature about 2° – 4°F. below the boiling point of the syrup. All of the lactose was dissolved over a period of about 35 minutes, and at that time the temperature of the syrup was 216°. The syrup was near saturation, with a lactose content of about 60 percent. A diatomaceous earth type of filter aid was added to the tank and dispersed in the syrup. The amount of filter aid used was about 2 percent by weight of the crude lactose source material. After a total treatment time of about 45 minutes in the tank, the syrup was pumped through a pressure filter while maintaining the temperature of the syrup at 216°F. The syrup was then supplied to crystallizing tanks where it was cooled to a temperature level of the order of 75°F. with crystallization of about 60 percent of the lactose content. The resulting material was then centrifuged for separation of the crystalline lactose, after which the crystals were subjected to washing with fresh water. The purified lactose was then subjected to drying and bagging. Analysis showed that the product had a purity of 99.5 percent hydrate lactose. With reuse of the supernatant from step 13 the overall yield of lactose was in excess of 90 percent of the crude lactose source material.

In the foregoing the invention is described as being applied to the refining of crude lactose produced by crystallization from cheese whey. The invention is also applicable to crude lactose contained in aqueous concentrates having a high lactose content together with impurities. More particularly, the invention is applicable to concentrates of high lactose content such as are produced by application of ultrafiltration to liquid cheese whey. Such a concentrate may consist mainly of lactose (e.g. 86 percent on dry basis), together with protein (e.g., 4.9 percent [N × 6.30]), and mineral (e.g. 8.9 percent). Some of the mineral content may have been removed as by ion exchange or electrodialysis. By way of example, the concentric may have a solids content of 60 – 70 percent whereby at ambient temperature a substantial portion of its lactose is in crystalline form. Such a concentrate can be heated to a temperature level of 216° – 220°F., without adding water or further lactose, to provide the hot syrup of step 10.

In addition to the use of concentrates as just described, in some instances both concentrates and crude lactose may be supplied to step 10 to provide a syrup of the desired concentration.

Due to tendency of concentrates as described above to foam, the filter used in step 11 should be of the pressure type. In the event the supernatant from step 13 is recycled for higher lactose yields, then the major part of the minerals should first be removed, as by ion exchange or electrodialysis, assuming that minerals are not largely removed in the production of crude lactose. Assuming recycling from step 13, then it is preferable to largely remove mineral from the permeate used to make the crude lactose, as by electrodialysis.

I claim:

1. In a process for refining crude lactose, the steps of dissolving crude lactose in water in such proportions and at an elevated temperature to produce a lactose concentrate containing from about 60 – 70 percent solids at a temperature level near the boiling point of the concentrate, whereby protein contaminants are precipitated and the batch heat sterilized with respect to spore formers, subjecting the resulting concentrate to filtration to remove solid impurities while maintaining the concentrate at substantially said temperature level, cooling the concentrate to effect crystallization of lactose, and removing the crystalline lactose from the mother liquor.

2. A process as in claim 1 in which the temperature level at the time of dissolving the crude lactose in water is maintained on a rising gradient whereby it is near but below the boiling point of the concentrate.

3. A process as in claim 1 in which a filter aid is dispersed in the concentrate before the concentrate is subjected to filtration.

4. In a process for refining crude lactose, the steps of dissolving the crude lactose in water in such proportions and at an elevated temperature to produce a lactose concentrate containing from about 60 – 70 percent solids at a temperature level about 2° – 4° below the boiling point of the concentrate whereby protein contaminants are precipitated and the batch heat sterilized with respect to spore formers, dispersing a filter aid in the hot concentrate, subjecting the hot concentrate to filtration to remove solid impurities while maintaining the concentrate at said temperature level, cooling the concentrate to effect crystallization of lactose, removing the crystallized lactose from the mother liquor, and returning at least a substantial part of the mother liquor to said first named step.

* * * * *